(Model.)
C. W. ALLEN.
Hay Rake and Buncher.
No. 230,982.                    Patented Aug. 10, 1880.
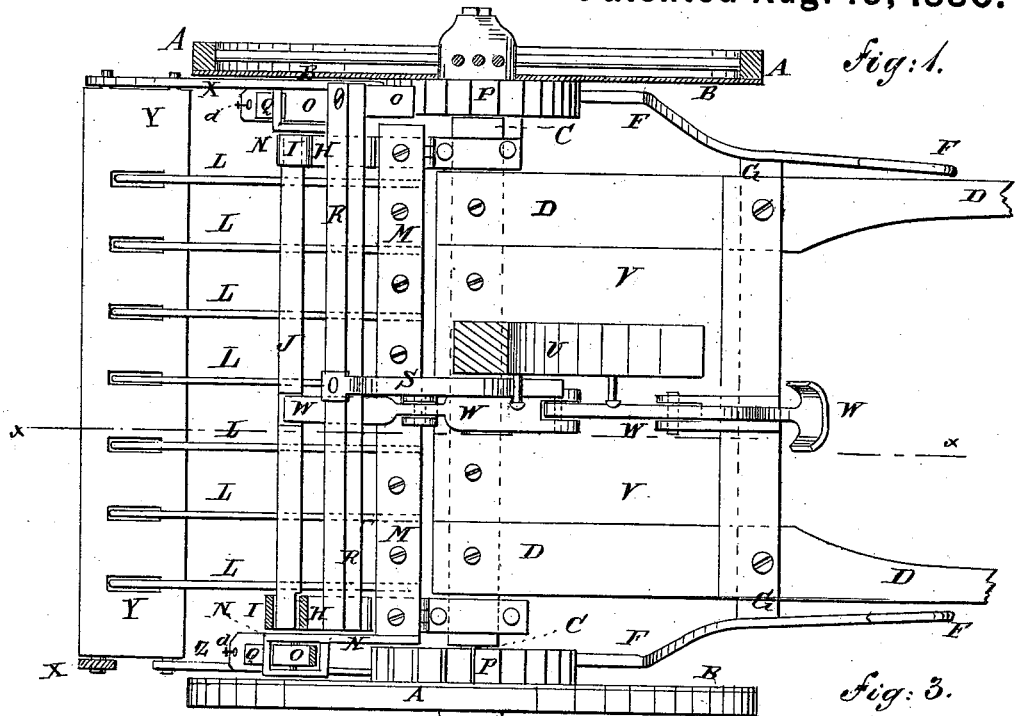
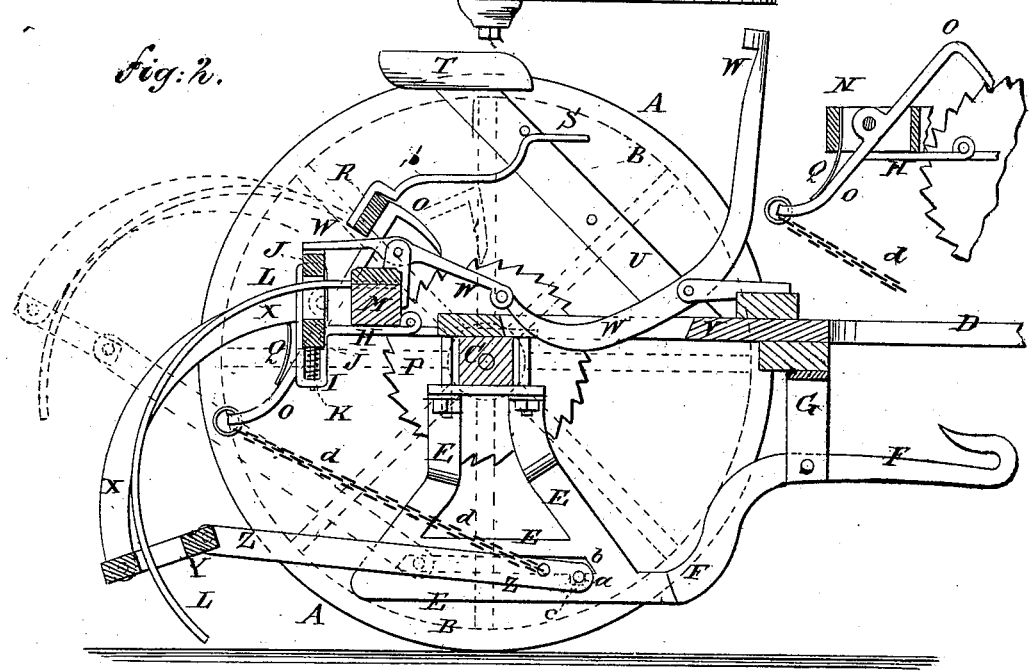
WITNESSES:
INVENTOR:
C. W. Allen
BY Munn & Co
ATTORNEYS.

UNITED STATES PATENT OFFICE.

CHARLES W. ALLEN, OF PINE RIDGE AGENCY, DAKOTA TERRITORY.

HAY RAKE AND BUNCHER.

SPECIFICATION forming part of Letters Patent No. 230,982, dated August 10, 1880.

Application filed May 6, 1880. (Model.)

*To all whom it may concern:*

Be it known that I, CHARLES WESLEY ALLEN, of Pine Ridge Agency, in the Territory of Dakota, have invented a new and useful Improvement in Hay Rakes and Bunchers, of which the following is a specification.

Figure 1 is a plan view of the improvement. Fig. 2 is a sectional side elevation taken through the line $x x$, Fig. 1. Fig. 3 is a side elevation of the dumping mechanism. Fig. 4 represents the lower part of one of the side hangers.

Similar letters of reference indicate corresponding parts.

The object of this invention is to furnish a hay rake and buncher so constructed that the hay may be dumped by the advance of the machine, and which will be easily operated and controlled.

A represents the wheels, which have sheet-iron plates B attached to their inner sides to prevent their spokes from raising the hay and to prevent the wind from scattering the hay. The wheels A revolve upon the journals of the axle C, to which are attached the shafts D, by which the machine is guided and controlled. To the axle C, near its ends, are attached two hangers, E, to the lower ends of which are welded, bolted, or otherwise secured the bars F. The forward parts of the bars F are bent upward and forward, and have hooks upon their forward ends to receive the whiffletrees, to which the horses are attached. The forward parts of the draft-bars F are supported and strengthened by bars G, attached to the shafts D. To the end parts of the axle C are hinged the forward ends of the bars H, upon the rear ends of which are formed slotted cross-heads I, to receive tenons formed upon the ends of the cross-bar J. The cross-bar J is held up by spiral springs K, placed beneath its tenons in the lower parts of the slots in the cross-heads I. The cross-bar J has transverse slots formed in it to receive the upper parts of the rake-teeth L and keep the said rake-teeth in proper relative positions. The upper ends of the rake-teeth L are attached to the cross bar or head M, the end parts of which are attached to the forward parts of the hinged bars H.
To the end parts of the rake-head M are attached rearwardly-projecting arms or sockets N, in which are pivoted levers O, the upper ends of which are bent forward at an angle, to serve as pawls to engage with the teeth of the ratchet-wheels P, attached to the inner ends of the hubs of the wheels A, so that the advance of the machine may raise the rake M L from the ground to dump the hay. To the rear parts of the sockets N are attached springs Q, which rest against the lower parts of the levers O, to hold their pawls away from the ratchet-wheels P. The upper parts of the lever-pawls O are connected by a cross-bar, R, so that they will move together. To the middle part of the cross-bar R is rigidly attached a lever, S, which projects forward into such a position that it can be readily reached and operated by the driver from his seat T to throw the lever-pawls O into gear with the ratchet-wheels P. The movement of the lever-pawls O is limited by pins attached to the side of the seat-standard U, which is attached to the platform V, secured to the shafts.

W is a jointed lever, the forward part of which is pivoted to a support attached to the forward part of the platform V. The rear part of the lever W is pivoted to a support attached to the rake-head M, and its rear end projects between the cross-bars R J, so that the rake-teeth L may be held down close to the ground or raised from the ground by operating the jointed lever W.

To the sockets or arms N are attached or upon them are formed rearward-projecting bars X, which are curved downward and forward, and to and between their lower ends are pivoted the rear corners of the cross-bar Y. The cross-bar Y is slotted transversely to receive the lower parts of the rake-teeth L, and to its forward corners are pivoted the rear ends of the bars Z. The forward parts of the bars Z pass along the inner sides of the bottom bars of the hangers E, and have hook-pins $a$ attached to the outer sides of their forward ends, which pass through slots $b$ in the lower parts of the hangers E, or in the rear parts of the draft-bars F, or between the draft-bars F and the bars of the said hangers E. In the draft-bars F, at the forward ends of the slots $b$, are formed notches $c$, to receive the hook-pins $a$, so that when the machine is used for bunching hay the rearward pressure of the hay against the rake-teeth L may be sustained by the draft-bars F. To the forward ends of the bars Z are attached the forward ends of the chains $d$, the rear ends of which are attached to the lower ends of the lever-pawls O, so that when the said lever-pawls are operated to throw them into gear with the ratchet-wheels P the first effect will be to raise the hook-pins $a$ out of the notches $c$ and allow the bars Z to slide back as the rake-teeth L are raised to dump the hay.

The buncher may be detached from the machine when not required for use.

Having thus described my invention, I claim as new and desire to secure by Letters Patent—

1. An improved hay rake and buncher, constructed substantially as herein shown and described, consisting of the carriage A C D, the rake M L J, the ratchet-wheels P, the lever-pawls O, and their connecting-bar R, lever S, and springs Q, the jointed lever W, and the buncher X Y Z $d$, substantially as herein shown and described.

2. In a hay rake and buncher, the combination, with the lever-pawls O, the rake M L J, the hangers E, and the draft-bars F, of the curved bars X, the slotted cross-bar Y, the pivoted connecting-bars Z, having hook-pins $a$ and the chains $d$, substantially as herein shown and described, whereby the rake-teeth are supported against the rearward pressure of the collected hay, as set forth.

3. In a hay rake and buncher, the carriage-wheels A, having sheet-metal plates B attached to their inner sides, substantially as herein shown and described, whereby the collected hay is protected from the spokes of the wheels and from the wind, as set forth.

CHARLES WESLEY ALLEN.

Witnesses:
EDWARD OSELWAY,
BENJ. CLAYMORE.